United States Patent [19]

Beckinghausen, Jr. et al.

[11] Patent Number: 5,309,752
[45] Date of Patent: May 10, 1994

[54] LEAKAGE MEASUREMENT INTO A GAS-CHARGED COLLAPSIBLE CONTAINER

[75] Inventors: Erwin S. Beckinghausen, Jr., East Amherst; Francis E. Pritchard, Buffalo, both of N.Y.

[73] Assignee: Praxair Technology, Inc., Danbury, Conn.

[21] Appl. No.: 914,397

[22] Filed: Jul. 17, 1992

[51] Int. Cl.$^5$ ............................................ G01M 3/04
[52] U.S. Cl. ........................................ 73/40.7; 73/46; 73/49.1
[58] Field of Search ............ 73/46, 40.7, 49.1, 40

[56] References Cited

U.S. PATENT DOCUMENTS

| | | | |
|---|---|---|---|
| 2,708,896 | 5/1955 | Smith et al. | 73/46 |
| 3,871,209 | 3/1975 | Hasha | 73/49.1 |
| 3,949,596 | 4/1976 | Hawk | 73/40.7 |
| 3,956,923 | 5/1976 | Young et al. | 73/40.7 |
| 4,244,208 | 1/1981 | Hauk et al. | 73/49.1 |
| 4,557,139 | 12/1985 | Cantwell et al. | 73/46 |
| 4,715,215 | 12/1987 | Perhach et al. | 73/49.3 |
| 4,879,896 | 11/1989 | Miller et al. | 73/46 |
| 5,029,463 | 7/1991 | Schvester et al. | 73/40.7 |

OTHER PUBLICATIONS

*Nondestructive Testing Handbook, Second Edition, vol. One*, Copyright 1982 American Society for Nondestructive Testing, Inc. pp. 478–489.
*Product and Vacuum Technology Reference Book*, Leybold Inc., 1990, pp. 64–74.

Primary Examiner—Hezron E. Williams
Assistant Examiner—Valerie Francies
Attorney, Agent, or Firm—Peter Kent; Chung K. Pak

[57] ABSTRACT

Apparatus and method for measuring a rate of leakage from a closed vessel enclosed in a container. Air is expelled from the container and a charge of helium-free gas is introduced. The preferred container is comprised of flexible sheets with mating edges sealed together. The flexible container is collapsed when air is expelled, and then limply charged with a known volume of helium-free gas. The vessel is pressurized with helium, the rate of accumulation of which is measured in the container gas to determine the leakage from the vessel.

8 Claims, 1 Drawing Sheet

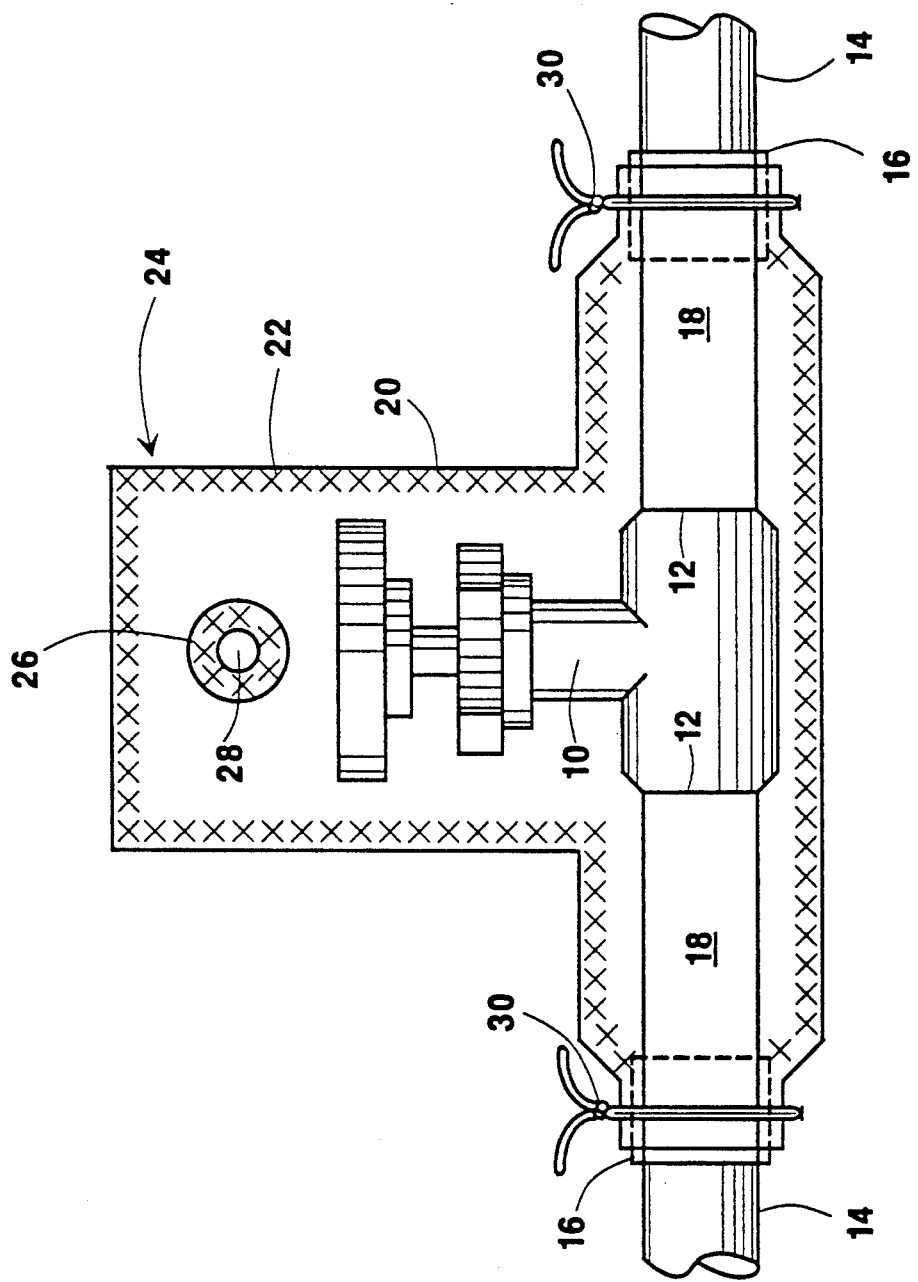

LEAKAGE MEASUREMENT INTO A GAS-CHARGED COLLAPSIBLE CONTAINER

TECHNICAL FIELD

This invention relates to measurement of rate of leakage of a gas from or through vessel walls.

BACKGROUND OF THE INVENTION

The semiconductor manufacturing industry requires piping or systems of high integrity for the transport of high purity gases for processing of semiconductors. These systems must be free of gas leaks to prevent entry by backflow of atmospheric contaminants such as moisture, oxygen and particulates. The industry is currently requiring that installations be evaluated for leakage, and that the leakage be less than a specific rate, defined in terms of a volume rate of flow of a specified fluid under specified conditions. A common specification is that the system be demonstrated to have a leakage rate of less than $2 \times 10^{-8}$ atm cc/sec ($2.03 \times 10^{-3}$ Pa cc/sec) when charged with helium gas to the normal operating pressure of the system.

While many methods of detecting leaks from a vessel are known, methods of quantitatively measuring leakage from a vessel are few. In the prior art, the leakage rate of a vessel which can be pressurized has been commonly measured by a technique known as accumulation testing. The method is described in the *Nondestructive Testing Handbook*, Second Edition, Volume One, Leak Testing, pages 481-482. The vessel to be evaluated is placed in a sealed enclosure termed an accumulation chamber. A standard helium leak apparatus is connected in a manner that will allow helium gas to pass at a known rate into the accumulation chamber for calibration purposes. A helium leak detector probe is inserted into the accumulation chamber. The leak detector reading is recorded as a function of time while the standard leak helium inflow rate is in effect, to obtain a calibration curve.

After the calibration data have been acquired, the standard leak is removed from the accumulation chamber, and the chamber is purged. The test vessel is then pressurized with helium, and the leak detector reading is recorded as a function of time. The vessel leakage curve is then compared with the standard leak curve to obtain a quantitative estimate of the leakage experienced from the vessel.

This method has several undesirable features. One is that the air in the accumulation chamber contains its naturally occurring 5 ppm helium as a background or interference. This background reduces the sensitivity and accuracy of the measurement of leakage of helium from the test vessel. Another is that the diffusion of tracer gas through the air being slow requires mechanical mixing of the air within the chamber for uniform dispersion of the tracer and accurate results. Another is that a vessel such as a valve in a pipeline is difficult to accommodate within a chamber. The pipeline can be allowed to protrude from the chamber, but a seal is necessary at the protrusions to avoid entry of atmospheric air into the chamber or escape of gas from the chamber. Still another undesirable feature is the lengthy time required for the performance of the leakage rate measurement because of the need for a calibration with a standard leak apparatus for comparison with the vessel leakage.

SUMMARY OF THE INVENTION

This invention reduces the disadvantages of the prior art method and apparatus for leakage measurement from a vessel. It provides a rapid method for leakage measurement with good accuracy and an inexpensive, simple apparatus which can accommodate a variety of vessel shapes readily.

The method comprises:

(a) enclosing the vessel in a closed container;

(b) expelling air from the container;

(c) introducing a known quantity of carrier gas into the container;

(d) pressurizing the vessel to a known pressure with a gas at a known temperature and containing a known concentration of tracer gas;

(e) allowing a known time interval to elapse;

(f) measuring the concentration of tracer gas in the carrier gas in the container; and (g) calculating from the known data the leakage rate of the tracer gas from the vessel into the container carrier gas.

In a preferred embodiment of the method, the container is formed by:

(h) placing at least one flexible sheet to extend around and beyond the vessel; and (i) sealing mating edges of the flexible sheet to complete the container with the vessel enclosed.

BRIEF DESCRIPTION OF THE DRAWING

The single drawing is a side view partly in section of a valve and its associated pipeline welds, which collectively are enclosed for leakage measurement in a flexible container pursuant to this invention.

DETAILED DESCRIPTION OF THE INVENTION

The use of the invention is depicted in the FIGURE and is described as applied to the measurement of leakage from a valve 10 and the welds 12 that incorporate the valve into a pipeline 14. The valve 10 and the pipeline welds 12 are considered to be a vessel. To facilitate cleanup of the pipeline after the completion of the leakage measurement, a layer of tape 16 is wrapped, preferably in a single spiral layer, around a short section of the pipeline upstream of the upstream weld incorporating the valve into the pipeline and around a short section of the pipeline downstream of the downstream weld incorporating the valve into the pipeline. These short lengths of pipeline extending from the valve are referred to as extensions 18 from the vessel. Self adhering plastic vinyl tape, which is readily removable, is suitable for this purpose.

A container which is preferably just adequate in size to accommodate the valve is placed around the vessel. If the container is rigid, parting lines are provided allowing the container to be placed in sections around the valve. The parting lines are subsequently sealed by known techniques, such as gaskets, caulking or other sealants. The pipeline extensions from the valve are allowed to protrude from the container through closely fitting openings in the container, and are sealed to the container also by known techniques.

In a preferred embodiment of the invention, the container is formed of flexible sheet as follows. A flexible sheet 20 is placed against the lateral surface on one side of the valve including the tape wrappings on the pipeline. A second sheet is similarly applied to the other side of the valve. The sheets are sized so as to extend beyond the outlines of the valve and the associated piping which has been wrapped. Optionally a single sheet may be folded to provide the two sheets described. Optionally several sheets may be used to more closely conform to the shape of the vessel being enclosed for evaluation.

The sheet material preferably comprises three thin layers, one each of polyethylene, nylon, and aluminum. A thickness of 0.5 mils (12.7 micrometers) is suitable for each of the polyethylene and nylon layers. The aluminum is deposited on the nylon in a sufficient thickness so as to provide a coating, typically to a thickness of 50 to 500 angstroms (50 to $500 \times 10^{-10}$ meters). The aluminum layer serves primarily to restrict the permeation of tracer gas through the sheet material. The polyethylene facilitates sealing of sheet material to sheet material by heat application. The nylon provides tear strength to allow the sheet material to be formed to the valve. For additional physical protection, the aluminum layer, which is deposited on a layer of plastic material, may have another layer of plastic deposited over it.

The sheets are sealed to each other by a seam 22 around the outlines of the valve and the associated piping so as to form a container around the valve and its welds. The seam may be made with a heated roller or heated clamp bar. Excess sheet material may then be cut away leaving, in effect, a container 24 in the form of a bag around the valve.

In one of the sheets, an opening 26 is provided into which is sealed the flange of a nipple so as to provide a port 28 for the container. The port is preferably located opposite a section of the container which can be collapsed against the port, as with a finger, in order to close the port.

A coating of vacuum sealant is applied to the tape wrappings on the extensions of the pipeline from the valve. An appropriate vacuum sealant comprises a high molecular weight acrylic polymer dissolved in a volatile solvent such as toluene. Vacuum sealant is also applied to the container openings through which the extensions protrude. The edges of the container openings are then conformed to the pipeline extensions and sealed by vacuum sealant to the tape wrappings. For additional security, a band 30 is placed around the container edges to bind the edges to the pipeline.

After the vacuum sealant has dried, air is expelled from the container through the nipple and port. In the case of a rigid container, air may be expelled using a vacuum pump to a pressure of 3000 Pa or below. In the case of a flexible container, air may be expelled using a vacuum pump, a syringe, or simply by collapsing the container by hand around the valve and its extensions. The flexible container is collapsed to conform to the valve as closely as possible without rupturing the container. The residual air in the collapsed container is near or preferably below atmospheric pressure depending on the method of expelling air and on how closely the container conforms to the vessel. The residual air in flexible container from which air has been expelled, that is, a collapsed container, may reach a pressure as low as 3000 Pa.

A known quantity of carrier gas, preferably tracer free, such as nitrogen or air, is then introduced into the evacuated or collapsed container through the port, and the port nipple is capped. The quantity introduced into a flexible container preferably is such that the container is left in a limp condition with the pressure of the gas in the container essentially atmospheric. During the operations of evacuating and charging the flexible container, the port is appropriately closed when desired by holding a finger against the container wall opposite the port and pressing this wall against the port.

To conduct the leakage measurement, the pipeline and the valve is charged, usually to its normal operating pressure, a typical pressure being $1 \times 10^6$ Pa, with a tracer gas, or a carrier gas containing a tracer gas. The preferred tracer gas is helium, and preferably, no carrier gas is used with the helium. However, nitrogen or argon, or other commonly available dry gases may be used for carrier gases. Other tracer gases may be used including halogenated hydrocarbons, hydrogen and argon, for example.

The vessel, comprising the pipeline and valve, are held in the pressurized state for a known time interval, typically several hours to one day. Preferably the time interval is such that a concentration of 10 to 20 ppm of helium by volume is attained in the gas in the container. Then the gas in the flexible container is mixed by kneading the container. In the case of a rigid container, a mechanical mixer may be provided, such as an impeller on a shaft protruding through a wall of the container. A sample is withdrawn from the container through the port and analyzed for tracer gas content.

A preferred method of analysis of the gas in the container is with a mass spectrometer leak detector. Prior to the analysis, the spectrometer and its probe are zeroed using gas identical to that charged into the container, typically tracer-free nitrogen. Also the spectrometer and its probe are calibrated on nitrogen with a known concentration of tracer. Thus the calibration constant of the spectrometer may be calculated from the equation $$K = C/x,$$

where K is the calibration constant, and C is the reading of the spectrometer obtained on nitrogen having a helium concentration of x. The concentration, y, of the helium in the container gas may be calculated from the reading, R, of the spectrometer on the container gas and the equation $$y = R/K.$$

The leakage, L, from the vessel may then be calculated from the equation $$L = yV/t,$$

where V is the volume of gas charged into the container and t is the time interval over which the leakage occurred.

EXAMPLE

A valve in a pipeline is enclosed in a container pursuant to the described invention. Air is expelled from the container, and then the container is charged with 1000 cc of nitrogen measured at 1 atmosphere ($1.013 \times 10^5$ Pa) and a temperature of 294 K. The pipeline and the valve is pressurized to $1 \times 10^6$ Pa for 86,400 seconds (24 hours). The helium mass spectrometer leak detector is zeroed on helium-free nitrogen, and then calibrated on nitrogen containing 50 ppm by volume helium resulting in a reading, R, of $16.3 \times 10^{-9}$. The calibration constant, K, is calculated as $$K = (16.3 \times 10^{-9})/(50) = 3.26 \times 10^{-10}.$$

The gas in the container is mixed, and the mass spectrometer probe is allowed to sample the container gas resulting in a reading of $5.9 \times 10^{-9}$. The concentration, y, of helium in the container gas is calculated as $$y = (5.9 \times 10^{-9})/(3.26 \times 10^{-10}) = 18.1 \text{ ppm by volume}.$$

The leakage rate from the valve and its pipeline welds is calculated as $$L = (18.1 \times 10^{-6})(1000)/(86400) = 2.09 \times 10^{-7} \text{ atm cc/sec}$$

($1.013 \times 10^5$ Pa) at 294 K, or 0.0212 Pa cc/sec at 294 K.

Although one embodiment of the invention has been described herein with some particularity, this disclosure has been made by way of example, and it should be recognized that numerous changes in the details and arrangement of the apparatus and the process may be resorted to without departing from the spirit and scope of the invention as hereinafter claimed.

What is claimed is:

1. A method for measuring a rate of leakage from a closed vessel, said method comprising:
   (a) enclosing the vessel in a closed, collapsible container;
   (b) expelling air form said container and collapsing said container around said vessel;
   (c) introducing a known quantity of carrier gas into said container;
   (d) pressurizing the vessel to a known pressure with a gas at a known temperature and containing a known concentration of tracer gas;
   (e) allowing a known time interval to elapse;
   (f) measuring the concentration of tracer gas in the carrier gas in said container;
   (g) calculating from the known data the leakage rate of the tracer gas from the vessel into the container carrier gas;
   (h) forming an opening in said container for an extension from the vessel to protrude from said container; and
   (i) sealing the edges of said opening around the protruding extension by affixing a layer of tape to the protruding extension, applying a coating of vacuum sealant to the tape, conforming the edges of the container openings to the tape, and placing a band therearound.

2. The method of claim 1 wherein said container is formed by:
   placing at least one flexible sheet to extend around and beyond the vessel; and
   heat-sealing mating edges of the flexible sheet to complete the container with the vessel enclosed.

3. The method as in claim 1 wherein air is expelled from said container by collapsing said container around said vessel by hand.

4. The method of claim 3 wherein said flexible sheet has a metalized layer.

5. The method of claim 1 wherein said container has port located opposite a portion of said container capable of being collapsed against said port so as to close said port, and the method, after step (c), further comprises the step of closing said port by collapsing said portion of said container against said port.

6. The method of claim 5 further comprising after step (e), the step of kneading said container to mix the gas in the container.

7. A collapsible container for enclosing a vessel for leakage rate measurement, said container comprising:
   (a) at least one flexible sheet folded around the vessel with the mating edges of said sheet sealed to each other to seal the container around the vessel;
   (b) a port located opposite a portion of the container which is capable of being collapsed against said port so as to close said port and
   (c) an opening in said container for protrusion of and means for sealing around an extension from the vessel, said means for sealing comprising a layer of tape affixed to the protruding extension, a coating of vacuum sealant applied to the tape, the edges of the container openings conformed to the tape, and a band placed therearound.

8. The container as in claim 7 wherein said flexible sheet has a metalized layer.

* * * * *

UNITED STATES PATENT AND TRADEMARK OFFICE
CERTIFICATE OF CORRECTION

PATENT NO. : 5,309,752

DATED : May 10, 1994

INVENTOR(S) : Beckinghausen, Jr., et al.

It is certified that error appears in the above-identified patent and that said Letters Patent is hereby corrected as shown below:

Column 5, line 29
In claim 1, step (b), line 1, delete "form" and insert therefor --from--.

Signed and Sealed this

Twenty-third Day of August, 1994

*Attest:*

BRUCE LEHMAN

*Attesting Officer*  *Commissioner of Patents and Trademarks*